United States Patent
Berry et al.

(10) Patent No.: US 6,404,747 B1
(45) Date of Patent: Jun. 11, 2002

(54) INTEGRATED AUDIO AND VIDEO AGENT SYSTEM IN AN AUTOMATIC CALL DISTRIBUTION ENVIRONMENT

(75) Inventors: Alfred E. Berry, Freehold; Allan M. Chang, Middletown; Rich Hamm, Spotswood, all of NJ (US); Rick Maiden, Littleton, CO (US); Sandra Milstead, Clarksburg, NJ (US); John Mitchell, Matawan, NJ (US); Bajinder Singh, Marlboro, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/088,640

(22) Filed: Jun. 2, 1998

(51) Int. Cl.[7] ............................................... H04L 12/16
(52) U.S. Cl. ........................ 370/270; 379/203; 379/265
(58) Field of Search ................................ 370/360, 352, 370/270, 260, 259, 264, 265, 464, 466, 467, 524, 219, 220, 309; 379/265, 242, 266, 88.13, 205, 309

(56) References Cited

U.S. PATENT DOCUMENTS

| | | | | |
|---|---|---|---|---|
| 5,555,017 A | | 9/1996 | Landante et al. ............. 348/15 |
| 5,751,791 A | * | 5/1998 | Chen ..................... 379/88.13 |
| 5,757,781 A | * | 5/1998 | Gilman ...................... 370/260 |
| 5,764,750 A | * | 6/1998 | Chau .......................... 379/220 |
| 5,894,512 A | * | 4/1999 | Zenner ................. 379/265.02 |
| 5,937,057 A | * | 8/1999 | Bell ............................ 379/266 |
| 6,138,139 A | * | 10/2000 | Beck ........................... 709/202 |
| 6,172,673 B1 | * | 1/2001 | Lehtinen ...................... 455/3.1 |
| 6,175,564 B1 | * | 1/2001 | Miloslavsky ................ 370/352 |
| 6,178,240 B1 | * | 1/2001 | Walker ........................ 379/266 |
| 6,212,178 B1 | * | 4/2001 | Beck ........................... 370/352 |

* cited by examiner

Primary Examiner—Douglas Olms
Assistant Examiner—Ricardo M. Pizarro

(57) ABSTRACT

A Video Multimedia Call Center (VMMCC) with multipoint access through a PBX (private branch exchange, also known as a switchboard) within an ACD (automatic call distribution) environment has both audio and video capabilities. The VMMCC extends traditional call center capabilities into the video and collaborative data domain. An organization using the VMMCC is able to provide a more personal and feature rich interface for both their customer service representatives and their end customers. Call center agents are able to communicate visually with customers at any location where the organization supports an endpoint. The agent and the customer have the added benefit of sharing data applications which provides the customer with a level of empowerment and understanding of the organization's operation that cannot be appreciated over a standard audio interface. Customers are able to see how their information is truly being represented by the agent. More complex transactions such as mortgage/loan origination interviews, customer help lines, and others are easier for the customer to understand with the ability to see the information unfolding. Errors in information collection are more readily identified through share applications than in traditional audio call centers.

21 Claims, 3 Drawing Sheets

INTEGRATED AUDIO AND VIDEO AGENT SYSTEM IN AN AUTOMATIC CALL DISTRIBUTION ENVIRONMENT

FIELD OF THE INVENTION

The invention pertains to the field of multimedia call centers. More particularly, the invention pertains to an integrated audio and video system in an automatic call distribution (ACD) environment that forms a "Work Blending Engine."

BACKGROUND OF THE INVENTION

A call center is a group of employees (agents) of a business or organization who serve customers, using telephone, facsimile, e-mail, the Internet, or remote video links to provide more convenient services such as sales, service, billing, or reservations. Today's audio call centers are highly effective and efficient organizations that handle potentially thousands of calls an hour. The audio call center work group is carefully managed through the use of specialized skill assignments to agents, advanced call routing algorithms, and comprehensive tracking of customer call history and related agent activity. All of the power of the traditional call center can be extended to incorporate the addition of multimedia call center agents as well as a new channel to provide for customers to reach these agents. In this context, the term multimedia refers to the ability to have call center agents interact with customers through an audio/video and data collaboration interface.

Multimedia video call centers prior to this invention have been limited to point to point applications where one end consists of a video kiosk and the other end consists of a video agent. Other multimedia video call centers provide audio calling to an agent with a video call back to the customer. In these configurations the shortcomings are the inability to conference others in the call and/or the inability to transfer the call after connection has been established.

SUMMARY OF THE INVENTION

Briefly stated, a Video Multimedia Call Center (VMMCC) with multipoint access through a PBX (private branch exchange, also known as a switchboard) within an ACD (automatic call distribution) environment has both audio and video capabilities. The VMMCC extends traditional call center capabilities into the video and collaborative Data domain. An organization using the VMMCC is able to provide a more personal and feature rich interface for both their customer service representatives and their end customers. Call center agents are able to communicate visually with customers at any location where the organization supports a customer access endpoint. The agent and the customer have the added benefit of sharing data applications which provides the customer with a level of empowerment and understanding of the organization's operation that cannot be appreciated over a standard audio interface. Customers are able to see how their information is truly being represented by the agent. More complex transactions such as mortgage/loan origination interviews, customer help lines, and others are easier for the customer to understand with the ability to see the information unfolding. Errors in information collection are more readily identified through share applications than in traditional audio call centers, where voice is the only communications method utilized.

According to an embodiment of the invention, a video multimedia call center includes receiving means for receiving at least one external call from a caller, the at least one external call including at least one of an audio component and a video component; automatic call distribution means, associated with the receiving means, for routing the at least one external call to a multimedia agent unit; and integration means for integrating the at least one of the audio and video component of the at least one external call at the multimedia agent unit.

According to an embodiment of the invention, a method for agents to interact with customers through an audio/video and data collaboration interface includes the steps of receiving at least one external call from a caller, the at least one external call including at least one of an audio component and a video component; routing the at least one external call to a multimedia agent unit; and integrating the at least one of the audio and video component of the at least one external call at the multimedia agent unit.

According to an embodiment of the invention, a video multimedia call center includes a private branch exchange for receiving at least one external call from a caller, the at least one external call including at least one of an audio component and a video component; an automatic call distribution center, associated with the private branch exchange, for routing the at least one external call to a multimedia agent unit; and a video call module for integrating the at least one of an audio and a video component of the at least one external call at the multimedia agent unit.

DESCRIPTION OF THE PREFERRED EMBODIMENT

Terminology and Acronyms

Figure 1:
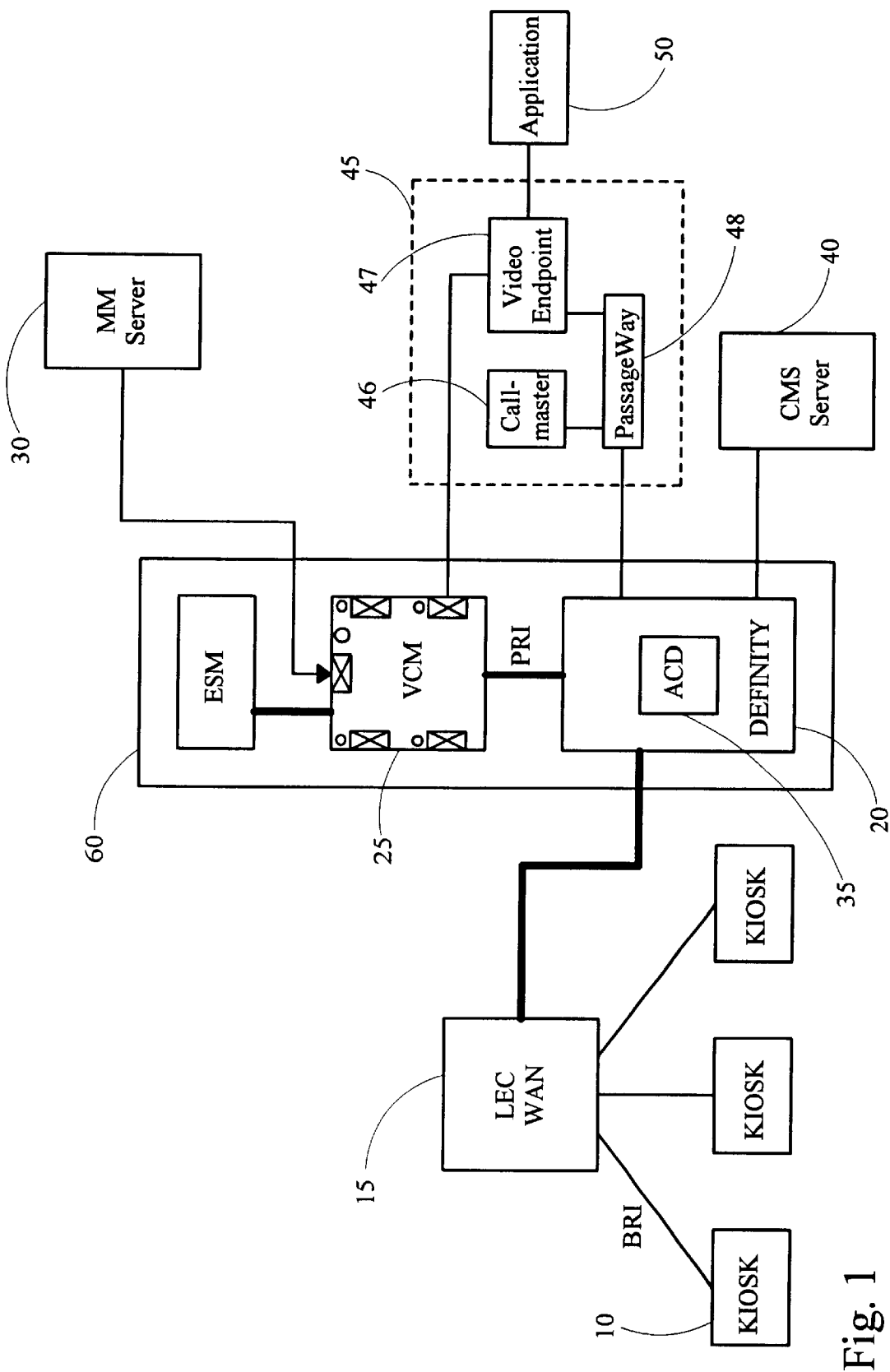
FIG. 1 shows a Video Multimedia Call Center (VMMCC) according to the present invention.

ACD—Automatic Call Distribution. ACD is a set of capabilities that allow for specialized treatment of incoming calls so that call distribution can be performed based upon knowledge of logged in call center agents and the characteristics of the inbound call. In the preferred embodiment, this term refers to the DEFINITY® software package that must be enabled to provide for agent selection and statistical information collection.

ACS—Agent Control Software. This is a communications software package that is resident on the agent PC to provide the graphical interface between the agent and the customer application. This software is used to communicate with both the ACD and the Video Call Module (VCM).

ANI—Automatic Number Identification.

CO—Central Office. This term is used to refer to the local switch operated by the local exchange carrier, such as Bell Atlantic, that provides telephone services to a public switched network.

Computer Telephony Integration (CTI): CTI is used by the ACS application to distinguish between incoming multimedia and voice-only calls.

Customer—The customer refers to the enterprise that purchases the VCM solution for their corporate use.

Customer call—This is an in-bound call to the queue. Calls that are in-bound to the queue will always be associated with customer kiosks and are the only calls that are subject to reconnection by the agent through the feature under development.

DEFINITY® ECS—DEFINITY® Enterprise Communications Server. At present, the DEFINITY® G3V4 is the minimum release required for operation within the video multimedia call center application of the present invention.

Expansion Services Module (ESM): This server, a component of the Video Call Module (VCM), terminates the T.120 set of protocols and enables the data collaboration between the customer, agent, and any other parties. This component is optional for those customers that wish to operate only in an audio/video mode before incorporating data collaboration into their operations.

Kiosk Customer—In this context, this term refers to the individual that will be using the kiosk that has been developed and deployed by the customer of the VMMCC.

LDN—Listed Directory Number. This is a telephone number that usually addresses an entire trunk group versus individual extensions. Typically it is the published number for a business location.

LEC WAN—Local Exchange Carrier Wide Area Network.

MCU—Multipoint Conferencing Unit. The MCU is composed of both hardware and software. The system level software that resides in the control complex of the Multimedia Services Module (MSM) enables the MCU to manage multiparty video/multimedia conferencing.

MSM—Multimedia Services Module. This is the set of hardware and carriers that comprise the MCU hardware. In the preferred embodiment, this set of hardware is based upon DEFINITY® proven technologies. There are a number of specialized circuit packs that only pertain to the MCU and VCM applications while there are others that are common across DEFINITY®, MCU, and VCM. The MCU and VCM preferably utilize the same MSM configurations.

PBX—Private Branch Exchange, preferably the DEFINITY® ECS system with a minimum release of G3V4 or later.

PC, video enabled—This term refers to a type of video capable device which could also be any other video device with the required software, such as a video phone.

Pilot Call—This term refers to the held call appearance on the multimedia agent's callmaster set that is associated with the kiosk customer call. This call is originated by the VCM to select a multimedia agent to handle a queued multimedia call.

Terminal Name—This is the key descriptor that is conveyed between the video endpoints and the VCM.

UCC—Universal Call Control. A set of DTMF (dual tone multi-frequency) commands used by the VCM to manipulate endpoints, conferences, and calls. The UCC commands are sent by the Agent Call Control (ACC) application to the VCM.

Unintentional Drop—Any disconnection of the customer from the agent conference before the termination of the intended call. A drop can be generated by hardware problems on the kiosk, agent PC, or BRI connection. Due to the lack of knowledge of unintentional vs. intentional drop by the VCM, a determination of whether a drop is intentional or unintentional is done by the call center agent directly. The agent must also make the decision as to whether or not to attempt a reconnect with the dropped customer kiosk.

VCM—Video Call Module, This term refers to the software developed for the cabinet hardware commonly referred to as the MSM or Multimedia Services Module. This software combined with the MSM provides a large portion of the video multi media call center capabilities on a server. The server is preferably based on field proven DEFINITY® hardware, using hardware in common with DEFINITY® which includes everything from the cabinet, cabling, and circuit packs. Many of the circuit packs can be used interchangeably with the DEFINITY® system. The VCM preferably borrows the system administration scheme used by DEFINITY® by using similar command structure and identical administration terminal hardware. The VCM provides software that allows for the multimedia features to operate in a call center environment. Agent PCs, through their video codecs, are directly connected to the VCM via ISDN BRI.

Referring to FIG. 1, multimedia calls are originated by a customer, are connected to a voice multimedia call center (VMMCC) 60, and are routed to an agent. The following is a generic call flow for multimedia calls entering the VMMCC 60 environment.

1. A customer steps up to a kiosk 10 or a video enabled PC, interacts with some "attract" application residing locally on kiosk 10, and then selects a service option which is translated to a number to be dialed by the video codec.

2. The call traverses a network 15 such as the PSTN (Public Switched Telephone Network) to an organization's PBX 20, such as the DEFINITY®, which routes the call to a VCM 25 directly with no direct processing.

3. The call is terminated by VCM 25 in a queue where a video or infomercial of the business may be playing. The infomercial is provided to VCM 25 from a multimedia (MM) server 30. A plurality of MM servers 30 are optionally linked to VCM 25 to service customers calling into different service queues. Customers calling into the same service queue preferably receive the identical infomercial broadcast.

At this time, kiosk 10 preferably has had some local presentation playing, but once the video call is established, the video image from the queue is presented to the customer. The customer now knows that he/she is in queue waiting for a connection to an agent by virtue of the change in the visual presentation. At this point, all protocol requirements have been met and this call can be redirected within the system with the relative ease of a standard audio call.

4. Simultaneously, the VCM 25 triggers an ACD module 35 within PBX 20, such as the DEFINITY® Call Center call distribution engine which searches for the "Universal Agent" that can best handle the call based on the dialed number (service requested) and skills of the agent. At this point, a call management system 40 (CMS) begins tracking the progress of this customer call.

5. The call is ultimately routed to an agent using an agent unit 45. Agent unit 45 is preferably a multimedia agent workstation which includes a video endpoint 47 such as a video enabled PC. This is typically a PC with a desktop video conferencing system (including software, PC board or board set, with a camera and headset) installed. This could also be any video means with specific software, such as a video phone. A phone set, such as a CallMaster unit 46, is the voice instrument used by the agent for receiving regular audio calls into the call center. It is also used by the agent to communicate with the VCM via touch tones to control the various operations on a video call connected to the agent (i.e., answering the call, hold/unhold, transfer/conference, etc). A CTI unit 48, such as the PassageWay CTI, connects the agent CallMaster unit 46 to the agent PC so that all phone operations can be controlled by a PC software interface.

6. The agent answers the call and within a few seconds the customer using kiosk 10 is in an audio/video conference with the agent using agent unit 45. The connection of CallMaster unit 46, video endpoint 47, and CTI unit 48 is done by the agent control software (ACS) which is described below.

7. At this point, the agent has many options in terms of processing this call. Agent unit 45, in conjunction with VCM 25 and PBX 20, preferably has the ability to:

a) add-on other "Universal" agents as necessary for consultation;

b) add-on an audio party such as an expert audio agent or the customer's spouse or lawyer, if necessary;

c) transfer the call to another specific agent or place the customer back in queue for a different service option;

d) place the customer on hold to consult with a supervisor or another agent;

e) disconnect the customer; or f) start an application 50 to share with the customer. This application 50 could allow the customer to perform the customer requested transaction. A call with a shared application could also include other multimedia agents who could join in an active collaborative mode or the call could be transferred to another agent without any loss of data, as long as the original shared application call is maintained.

If a universal agent is not found to be idle within the queue time-out period, then the customer is automatically redirected to an audio agent possessing the skills to handle the services required.

In addition, audio-only customers dialing into the call center could be matched to a "Universal Agent" during times when the video calling may not be very active. The agent would handle an audio-only customer in the same fashion as is done in the prior art.

Three key features are present in the system: (1) work blending, that is, providing both audio and video integration at the agent position in an ACD environment, (2) the ability to conference or transfer to an audio and/or video agent while in the video call, and (3) the detail call setup method starting with the incoming video call, routing the video call to the agent, and the addition of data. These three features together form a "Work Blending Engine" that results in a personalized working environment capable of achieving a multimedia presence between working parties that enhances and enriches communications between distant parties.

The desired agent endpoint features via the ACS (Agent Control Software) include the ability to:

a) login and logout of the VCM 25 agent conference;

b) answer incoming video calls automatically or through manual control;

c) place audio (H.320 or non-H.320 ) or video (H.320 and H.320 with T.120) calls to any properly equipped endpoint;

d) conference to add audio or other multimedia parties with or without data sharing whether they are local or remote to the call center;

e) conference customers to other agents for further servicing without loss of T.120 data;

f) place customers on hold so the agent can consult with other agents or for adding another party;

g) drop a particular party;

h) send a customer back into a queue for agent selection of another service;

i) manipulate the characteristics of the local image of the remote camera, if the endpoint supports this capability;

j) issue a command to reconnect a dropped customer;

k) distinguish incoming calls from the ACD center as voice-only or multimedia calls; and l) mute video and/or audio to the customer.

ITU-T Recommendation H.320 (LINE TRANSMISSION OF NON-TELEPHONE SIGNALS, Narrow-Band Visual Telephone Systems and Terminal Equipment), ITU-T Recommendation H.243 (LINE TRANSMISSION OF NON-TELEPHONE SIGNALS, Procedures for Establishing Communication Between Three or More Audiovisual Terminals Using Digital Channels Up to 2 Mbit/s), and ITU-T Recommendation TA.120 (TERMINAL EQUIPMENTS FOR PROTOCOLS FOR TELEMATIC SERVICES, Data Protocols for Multimedia Conferencing) are incorporated by reference herein.

The ITU H.320 specification is the parent recommendation that details the technical requirements for narrow-band visual telephone systems and terminal equipment. The ITU T.120 recommendation is also a high-level technical requirement specification that details the necessary components for providing multipoint multimedia data collaboration. The VMMCC 60 supports H.320 endpoints which are currently the prevailing video endpoint standard of choice.

VMMCC 60 supports the following standards, either in whole or in part that pertains to communications servers, which are all incorporated herein by reference: G.711—pulse code modulation of 3 kHz audio channels; G.722—7 kHz audio coding within a 64 kbit/s channel; G.728—coding of speech at 16 kbit/s using low delay code excited linear prediction (LD-CELP); H.221—frame structure for a 64 to 1920 kbit/s channel in audiovisual teleservices; H.230—frame-synchronous control and indication signals for audiovisual systems; H.231—multipoint control units (MCUs) for audiovisual systems using digital channels up to 2 Mbit/s; H.242—system for establishing communication between audiovisual terminals using digital channels up to 2 Mbit/s; H.243—procedures for establishing communication between 3 or more audiovisual terminals using digital channels up to 2 Mbit/s; H.261—video codec for audiovisual services at p×64 kbit/s; H.320—narrow-band visual telephone services where channel rates do not exceed 1920 kbit/s; T.120—series of recommendations to provide a means for telecommunicating all forms of data/telematic media between 2 or more endpoints; T.122—Multipoint Communications Service (MCS) for audiographics and audiovisual conferencing; T.123—transport protocol stack for audiographic an audiovisual conferencing; T.124—(T.GCC)—Generic Conference Control (GCC) for audiovisual and audiographic terminals; T.125—MCS protocol specification; T.126 (T.SI)—still image protocol specification; and the T.127 (T.MBFT)—multipoint binary file transfer protocol specification.

VMMCC 60 preferably includes the following system level features:

Multimedia Oueues. The VCM 25 preferably supports a number of different queue conferences on the system that can answer incoming calls from customer kiosks 10. An optional infomercial source, such as MM server 30, can be used with each queue. This source can be anything from a view-graph slide show to a VCR playing a professionally recorded tape of the organization's services and/or products.

System-Level Hold Conference with Infomercial/Transient Hold Conferences. The VCM 25 preferably supports either a system level hold conference with an infomercial multimedia source or a Voice Activated Switching (VAS) "transient" conference where all members are able to communicate with each other. The system level hold conference allows for only one conference per system where all agents can placed their customer on hold. If there is no multimedia source or the system hold conference is not administered, then each agent placing the customer on hold will create a transient conference for that customer on hold. The VCM 25 preferably provides natural video image switching based on complex speech processing algorithms that allow for smooth transitions between active speakers without allowing spurious noises to affect the switching.

Queue Time-out Outflow. The VCM 25 preferably allows for system level queue and hold conferences to dial out to an audio-only vector directory number (VDN), i.e., a destination, based on an administrable timer. The hold conference is preferably governed by a system level timer; however, each multimedia queue preferably has a separate timer allowing for more urgent services to outflow to audio agents sooner than other services. This ability enhances the flexibility of the call center and reduces the potential for abandoned calls by utilizing other call center resources when holding/queuing times for multimedia endpoints are excessive. The VMMCC allows the audio-only agents to serve the video customers when necessary. No changes to the audio agents are required to let them handle multimedia customers through their standard telephone set. The blending of media streams is performed by VCM 25.

Connection of Audio/Multimedia Endpoints. Agents are preferably able to add-on other endpoints, including multimedia agents/supervisors, multimedia enabled endpoints that may be located in distant service centers, an audio party requested by the end customer, and an expert audio agent.

Redirection of a Customer. Similar to some standard DEFINITY® Call Center features, the agent preferably is able to redirect a customer call to a new service queue upon completion of the current transaction. Typically, a customer may want to address several concerns with a single call into a customer sales & service center. The same agent may not have the expertise to handle all the concerns. The "Universal Agent" sends the customer to another video or audio queue to await service by an appropriate agent. There is substantial benefit to the customer since the customer does not have to deal with the delay introduced in tearing down the existing call and setting up a new video call into the service center.

Service Observing. Call center supervisors can monitor the audio portion of the multimedia agent's session. The supervisor is also able to participate in the session or mute themselves using their local mute button.

Multipoint Application Data Sharing. The ACS invokes the data collaboration facility that enables all parties on a multiparty video call to share a software application together. This data collaboration facility could be a special package developed by the video endpoint manufacturer or a third party application such as Microsoft's NetMeeting.

Reconnection of Dropped Customers. Customers dealing with this new technology may inadvertently disconnect themselves during a transaction, or a possible network infrastructure problem may tear down a call prematurely. In either of these cases, the agent can reestablish communication with the customer by dialing out of the call center. The system remembers the customer location to which each agent was last connected, so the agent needs only to request a reconnection through the ACS software interface.

Local and Remote Image Enhancement. ACS allows the agent to adjust the picture quality of the local camera image and the incoming remote picture by adjusting variable such as brightness, color, etc.

On-line Help. ACS has on-line help that is functionally organized similarly to the agent user guide. This on-line help is modeled after the standard Windows on-line help hyperlink design.

Easy Access Button Panel. A button panel within ACS provides quick access to the call, hang-up, hold, unhold, transfer, queue, conference and drop functions through the use of labeled icons. This button panel can optionally be collapsed to gain more screen real estate. ACS also supports less frequently used options through the use of pull down menus.

Mute Control. ACS allows the agent to mute and subsequently unmute both the audio & video portion of the call, or only the audio portion, through a set of buttons on the call window display. When a new call is delivered to the agent in a muted state, the agent position reverts back to the talk state when the call is being set up.

Channel Aggregation/Association. From the network, it is possible to have calls with the same ANI, different ANI, or no ANI. In some cases, the customer access endpoints into the VMMCC may be endpoints that do not provide ANI or provide different ANI numbers for each, BRI B-channel. This becomes problematic when the VCM 25 attempts to join two B-channels; together to complete a 2B call. The VCM 25 preferably provides three forms of channel association for incoming calls: matching based on same number ANI, matching based on different ANI as listed in the kiosk table, and direct hunt group member dialing. Same number ANI matching looks for two incoming calls to a hunt group number that contain the same ANI information. Matching different ANI makes use of the kiosk table to join the incoming B-channels by comparing the incoming different ANI and matching those numbers to a single entry in the kiosk table. Direct hunt group member dialing can be used in order to provide channel aggregation for those terminal endpoints that do not provide ANI at all.

Security Enhancement for UCC Commands. The VCM 25 will block the completion of any UCC command that attempts to add an audio or multimedia party to the conference while the agent video connection is not active. This enhancement prevents anyone from accessing a UCC port and initiating multiparty conferences by dialing out of the agent conference. An agent will be able to detect someone on the UCC port of their home conference, because that agent will not be able to establish a UCC connection to the VCM 25.

Dynamic Allocation of Resources for Static Conferences. The VCM 25 resources are setup in a pooled resource configuration. Resources include the MCU-extension numbers, trunks, T.120 connections, and number of active conferences. The system preferably includes these pooled resources particularly when considering the service observing level, percentage of calls requiring transfers off of the VCM, number of customers in queue at any given time, expected wait time vs. time-out administration, and other factors.

VCM 25 preferably runs on the same hardware platform as the MCU, known as the MSM. When T.120 data sharing capabilities are included, the overall VCM 25 configuration preferably includes the ESM hardware and software that is a part of the existing MCU. Features and capabilities of the VCM 25 preferably include:

a) dynamic allocation of resources for incoming/outgoing multimedia and audio-only calls (minimal pre-administered parties);

b) support for multiple system-level queue conferences;

c) support for 2B channel association for incoming calls with same and different number ANI on each channel (non-bonded sessions), as well as support to incoming calls from endpoints without ANI;

d) "drop party" capabilities, whether individual, all, customer, or agent;

e) ability to reconnect a dropped customer upon request from agent software;

f) provide a system-level hold conference with a video source;

g) ability to outflow calls from either a hold conference or a queue based on an administrable timer to an audio agent;

h) ability to have a service observer as an audio party on each agent conference;

i) ability to conference multiple parties onto a single conference (multimedia or audio-only calls);

j) ability to associate a surrogate "audio" call launched towards the ACD with the video call to provide customers with the advanced EAS and routing information already available to them in their existing call center environments and CMS data collection from the surrogate "audio" call statistics off of the ACD;

k) multiple dial-out numbers for the surrogate audio calls, are supported per queue;

l) ability to have transient conferences for temporary operations such as connections to audio number after queue time out and non-system level holds;

m) ability to transfer a customer from one agent to another;

n) ability to conference other parties to the current call;

o) ability to requeue a customer to a different queue conference;

p) ability to monitor the current status of all conferences;

q) ability to restrict access to UCC, agent video login, and service observing via password; and r) remote outbound dialing being only permitted by an agent or supervisor that is logged into the multimedia services.

The Agent Control Software (ACS) is preferably a Windows based application that presents the agent with an easy-to-use graphical interface which interacts with the customer. Video of both agent and customer are always present on the screen while the agent actively engages in communication. Function keys are preferably provided for features such as calling, conference, transfer, drop, hang-up, hold, and queuing. ACS is also used for starting the T.120 data collaboration session between the agent and the customer. Data collaboration can be performed through the endpoint's specific collaboration software or through a third party application such as Microsoft NetMeeting.

Preferable features of the ACS include:

a) User Interface Consistent with GULLF Standards. The ACS software includes the Graphical User Look Listen and Feel (GULLF) standards to provide an interface that is consistent with other Lucent GUI applications and has icons that are readily understood.

b) Agent Login and Logout Capability. The agent has the ability to login and logout of the VCM 25 through the ACS interface. The login procedure optionally includes a password request that would be activated by the VCM 25. For example, password prompting requires support from the video endpoint. The Intel Proshare can handle password prompting from the VCM 25.

c) Agent Reconnect Option Selection. The agent can invoke a request to reconnect a dropped customer simply by selecting a menu option on the ACS interface known as "reconnect customer." All the background operations to reconnect the customer are handled by the VCM 25 once the request has been made. A reconnect request should only be issued by the agent for calls that were established for at least 15 seconds before drop. Reconnect requires that the video endpoint of kiosk 10 support and transmit the terminal name towards the VCM 25.

d) Local and Remote Image Enhancement Capability. ACS allows the local user to adjust the picture quality of the local camera image and the incoming remote picture by adjusting brightness color, etc.

e) Local Directory for Automatic Dialing of Multimedia and Audio-Only Endpoints. For any calling function, including transfer and conference, from within the ACS application, a call window will be used to display all known telephone numbers internal/external for both audio-only and video endpoints. There is an additional tab to allow for the agent to type in a telephone number for an audio outbound call.

f) On-line Help. ACS includes on-line help that is functionally organized similarly to the user guide. This on-line help is modeled after standard Windows on-line help hyperlink design.

g) Button Panel: Call, Hang-up, Hold, Unhold, Transfer, Queue, Conference, and Drop. A button panel within ACS provides quick access to these functions through the use of labeled, icons. This button panel can be collapsed to gain more screen real estate.

h) Application Data Sharing. Application data sharing within a multimedia call is invoked from within the ACS application. Currently, data sharing is only available between like endpoints, such as, for example, between all Intel or all Zydacron endpoints within a conference. Mixed conferences between Intel and Zydacron do not provide for data sharing. Intel Proshare uses Intel's own software package for T.120 data sharing while Zydacron utilizes Microsoft's NetMeeting for data sharing. As technology advances these restrictions may not exist.

i) Manipulation of CallMaster Calls through Passageway and FastCall Applications. ACS controls the CallMaster call appearances through the use of Passageway Direct Connect and FastCall. The first call appearance is used by ACS to provide the UCC connection to the VCM 25. The second call appearance is used for the incoming ACD calls. FastCall makes the determination by use of VDN numbers of whether the incoming ACD call is a multimedia or audio only call. Incoming multimedia calls trigger the "Answer" dialog box on the ACS interface. Incoming audio calls are to be handled as normal by the agents.

j) Mute Control: Video and Audio. ACS allows the agent to mute and subsequently unmute the audio and video portions of the call or only the audio portion through a set of buttons on the call window display. When a new call is delivered to the agent in a muted state, the agent position is reverted back to the unmuted state when the call is being set up.

k) Multiple Video Call Answering Modes. ACS can be configured for either automatic or manual answering of the incoming video call. Both modes provide a visual cue that indicates the presence of an incoming video call. The automatic answering provides a blinking cue that remains blinking for eight seconds while connecting the video call. The manual answering provides a dialog box with an "Answer" button that must be depressed by the agent in order for the video call to connect to that endpoint.

l) Requeuing a Customer Call. VCM 25 supports multiple service queues used to provide different infomercials for the incoming customer call. These different queues can be used in conjunction with the ACD software to perform specialized agent selection. For example, callers to the ACD are frequently assigned a preferred group of agents for handling their transactions. Upon calling in to the ACD, these callers are identified and routed to the preferred agent. The ACS interface provides three configured queues plus an additional entry where an agent can dial an extension. For example, an agent working as a mortgage expert may come to the end of the transaction with a customer when that customer realizes a need to speak to someone else about credit cards. The agent may not be adequately trained to deal with credit card issues; therefore, the agent can send the customer to the credit card queue in VCM 25, beginning the agent selection process for a multimedia credit card agent. This ability saves the end customer time by not having to tear down the video call and establish a new call into the credit card queue.

Figure 2:
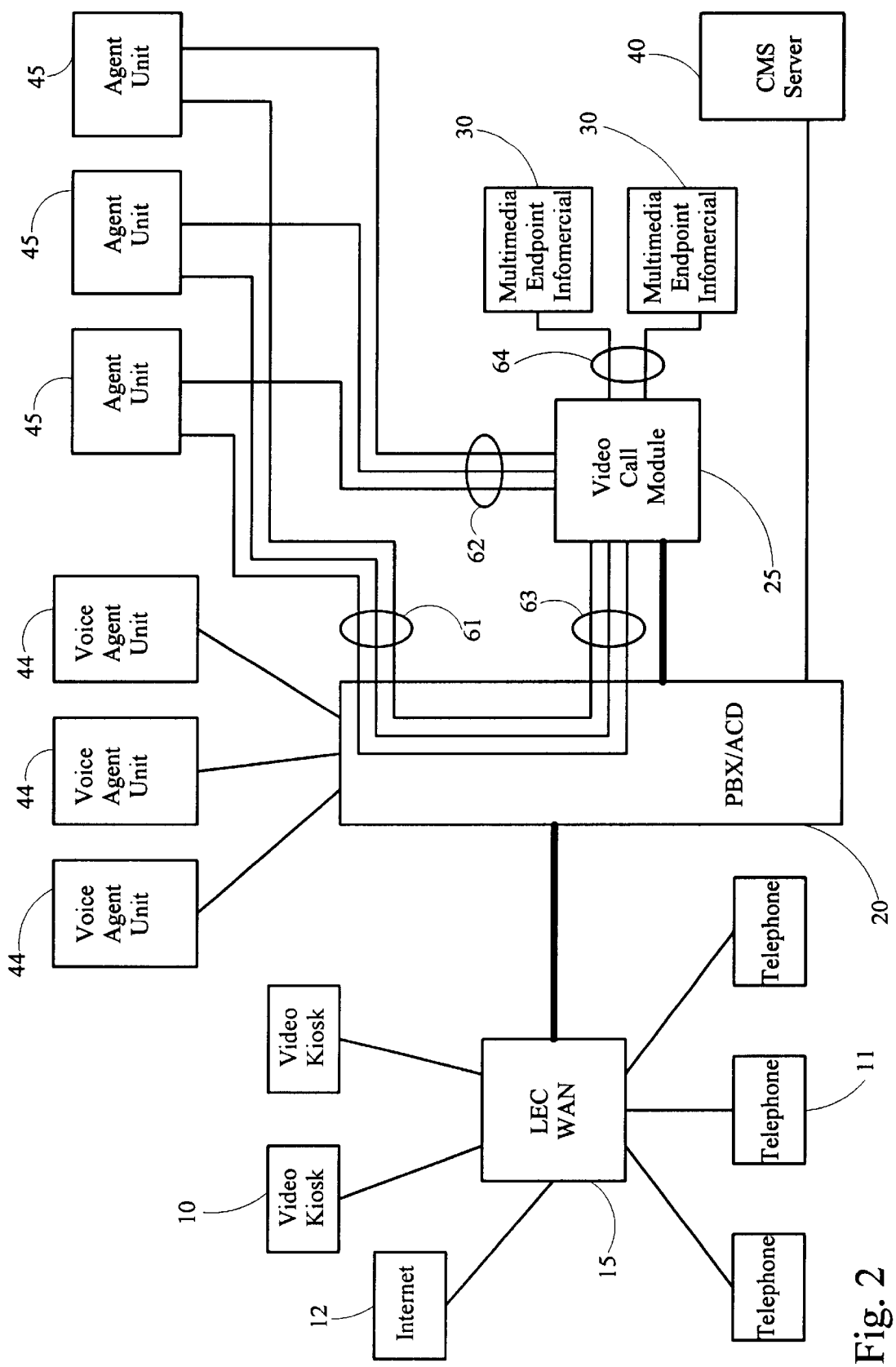
FIG. 2 shows the architecture of the present invention for an environment where the agent multimedia PC's are based in Windows 95.

Referring to FIG. 2, a video multimedia call center (VMMCC) is shown for an environment where the agent multimedia PCs (MM PC) are Windows 95 based. An automatic call distribution (ACD) system is implemented within the call center. For example, a customer calls into the multimedia call center from a customer access point such as a video kiosk 10, a telephone 11, or a video-enabled PC via an internet link 12 to establish a video link between the agent at an agent unit 45 and the customer.

Through a screen-pop, ACS alerts agents of an incoming multimedia call while audio-only calls are allowed to alert the CallMaster terminal. The CTI interface is also used by ACS to perform outbound call control for both audio-only and multimedia calls. Audio-only calls are handled at a voice agent unit 44. This interface also provides the ability to control the state of the call, audio-only or multimedia, by invoking post-connect services such as Hold, Conference, Transfer, etc. There are two ways to provide computer telephony integration (CTI) depending on the operating system that is being used on the agent multimedia PC:

(1) PassageWay Direct Connect is a Windows 95 based solution which includes a small adapter device connected to the COM port of the agent PC and software that allows for control of incoming calls to agents through the ACS interface. PassageWay obtains call information from the DCP (Digital Communication Protocol) line that is connected to the agent's standard call center telephone via the PassageWay Direct Connect adapter.

(2) PassageWay Telephony Services is a TSAPI-compliant Windows NT based solution which provides software for both the NT server and NT workstation. This solution makes use of the existing LAN configuration (TCP/IP, IPX, etc) to send all call control requests to the central NT server that in turn communicates with ACD. This server is preferably shared with other services such as network printing, user account authentication, and so on.

Both the customer access kiosks and the agent PC's in the call center can be connected to the Internet. This access provides the following features:

(a) The calling customer at the kiosk can choose to surf or play streamed video clips from a web site while waiting for a call to be connected. This is an alternative way of keeping customers engaged during a video call setup as opposed to broadcasting a video infomercial from a specified multimedia endpoint infomercial source 30 at the call center.

(b) After the H.320 video call is established between a customer and an agent, both parties can view and work on the same web pages on the Internet. This provides an alternative way of performing data collaboration as opposed to using the T.120 implementation described herein.

A grouping 61 is preferably a plurality of digital phone lines connecting the agent units 45 for agents to the PBX/ACD 20. These connections are the transport for regular voice calls to the agents as well as for touch tone control messages for video calls from agent unit 45 to the Video Call Module 25 (VCM).

A grouping 62 is preferably a plurality of ISDN BRI lines connecting the H.320/T.120 video endpoint installed on the agent PC's to the VCM 25. These connections are the transport for H.320 video calls (including video and audio) and T.120 data.

A grouping 63 is preferably an ISDN BRI connection between the PBX/ACD 20 and the VCM 25. This connection is the transport for H.320 video call connections between Video Kiosks 10 and agent stations 45 as well as the T.120 data. This grouping also handles the touch tone video call control messages from the agent units 45 to VCM 25.

A grouping 64 is preferably a plurality of ISDN BRI lines connecting multimedia endpoint infomercial sources 30 to VCM 25. These connections are the transport for the video infomercials played from 30 to video kiosks 10 when the H.320 video calls from video kiosks 10 are first connected to the call center and placed in queue waiting for available agents.

Figure 3:
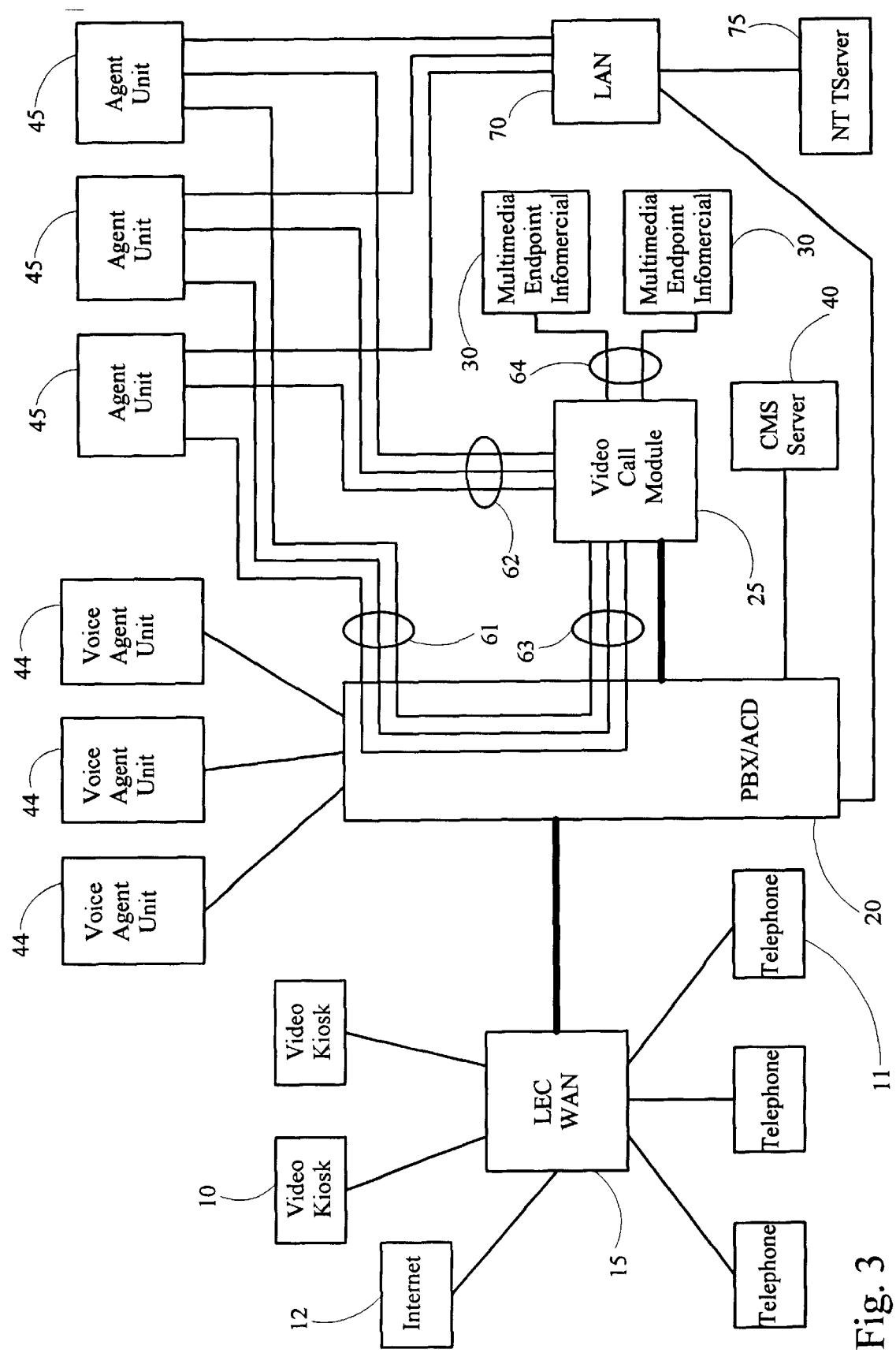
FIG. 3 shows the architecture of the present invention for an environment where the agent multimedia PC's are based in Windows NT.

Referring to FIG. 3, a multimedia call center is shown for an environment where the agent multimedia PCs are Windows NT workstations. Functions which are similar to the functions explained with respect to the embodiments shown in FIGS. 1 and 2 are not repeated here for the sake of brevity. Similar reference numerals indicate similar structures. There are no functional differences that can be perceived by the agent relevant to the VMMCC Agent Control Software (ACS). The differences are purely operational with regard to how the computer telephony integration is handled with the PBX. Video of the agent and customer are always present on the screen while the agent actively engages in communication. Function keys are preferably provided on the screen such as call, conference, transfer, drop, hang-up, hold, and queuing. ACS also controls T.120 data collaboration sessions launched by the agent. The Video Call Module (VCM) 25 provides software that allows for multimedia features to operate in a call center environment. Agent stations are connected to the VCM 25 via ISDN BRI and to the ACD via the DCP call center phone.

PBX/ACD 20, a server such as PassageWay NT T-Server 75, and agent units 45 are all connected through the a Local Area Network (LAN) 70. This connection provides communications between the respective units. For example, when an agent at agent unit 45 performs a phone control function, a CTI message is sent to PassageWay NT T-Server 75 over LAN 70, which sends a corresponding CTI command over LAN 70 to PBX/ACD 20, which performs the control function operation. Agent unit 45 optionally can also access LAN servers (not shown) for customer information and transaction.

PassageWay NT T-Server 75 manages all phone functions for the agents. It eliminates the need for agents to manually perform phone functions on the physical set or through a software interface on the agent's PC (first party call control, in CTI terminology). PassageWay NT Server 75 receives CTI request messages from the agent triggered by the software application controls (i.e., icons, buttons, or menus, etc) and directs the PBX/ACD 20 via the CTI commands to perform the requested functions. This third party call control allows computers to control phones in addition to providing greater reliability (i.e., confirmation for requests/commands and success/failure messages after performing each request/command, etc.)

Operation of the VMMCC

VCM 25 preferably provides an administerable table ("table of names") in the software where the customer is able to enter the terminal name and phone number(s) of each of the kiosk locations . The length of the terminal name is preferably limited to 15 characters. The length of the dial string is preferably 22 dialed digits+1 prefix digit totaling 23 digits. Terminal names are preferably alphanumeric including spaces.

The VCM 25 table of names is used by call processing software in conjunction with the call record to uniquely identify which kiosk was connected to which agent on the event of the "reconnect" signal from the ACS software. This table is also used in conjunction with the different ANI based channel aggregation feature. Kiosks that have different ANI for each B-channel are associated with each other based upon the extensions in this table. A table of terminal names is used because the terminal names are administerable on a per-endpoint basis and become available to the switch provided the connection remains intact long enough for that information to have been received, typically 15 seconds. ANI information is not always guaranteed to be available or correct. It is possible that the PBX or CO at a given kiosk site can strip out the ANI, replace it with a trunk group number or LDN, or could simply not provide ANI service.

The reconnect feature preferably works as follows. The receipt of the "reconnect customer" signal from ACS triggers the VCM 25 to look up the customer call from the call record of the requesting agent. The software then matches the terminal name of the customer call in the call record to the terminal names within the kiosk table. If a match is found, then the dial-out strings contained in the kiosk table are used to reconnect the customer. If a match is not found, then the request fails.

The customer kiosk is placed in an auto-answer mode or has an "Answer" button on the screen so that the inbound call from the VCM 25 agent can terminate to that endpoint. This requirement is placed on the customer because it is possible that the kiosk customer, realizing that the call was dropped inadvertently, will try to reconnect herself/himself However, initiating a new outbound call does not guarantee that the kiosk customer will be reconnected to the same agent.

To guard against a race condition, the kiosk software preferably establishes a "glare guard" timer on the outbound origination side of the kiosk started at the time of call drop. This "glare guard" timer could be administered to the maximum known call setup time for this reconnect feature on a by-customer basis since configurations can vary. This timer would start once a call has dropped and would prevent the kiosk customer from initiating an outbound call to the queue until this timer expires. If the in-bound calls are auto-answered, then the call screen is placed in the foreground as the active screen.

Administration is consistent across kiosks and the VCM kiosk table. This is a requirement upon the customer administration personnel that is vital to the operation of this feature. All wording of the terminal name on the endpoint administration and the VCM 25 kiosk table should be identical. It is necessary that the terminal name administered on the endpoint and the terminal name administered on the VCM 25 be consistent so that the VCM 25 can identify the incoming terminal name as a known endpoint within its table.

The customer updates the VCM 25 kiosk table when endpoints are added/removed. The customer administration of endpoints in the VCM 25 table must be updated as endpoints are added and removed. When a kiosk endpoint is added to the video call center environment, the terminal name and endpoint ISDN numbers must be registered in the VCM's kiosk table so that they conform with requirements.

Multimedia agents are not administered, i.e., not available from a system standpoint, to receive calls immediately on customer drop. This setup prevents a new call in the queue from terminating at the agent while that agent is attempting to reconnect a dropped customer. This requirement can be fulfilled by a simple administration change on the ACD software. There are two methods to provide this capability through administration.

First, the agent can be administered in manual-in work mode which automatically places agents in the ACW (After Call Work) state after disconnecting from an ACD call. In this state the agents are unavailable for incoming ACD calls, and they must actively request a call in queue.

Second, the agent can be administered in auto-in work mode with a pre-defined ACW time period after each call. In this scenario, when an agent completes an ACD call, the ACD places that agent in ACW work mode, unavailable for incoming calls, for a pre-administered period of time. Upon the expiration of this ACW time, the agent is automatically made available for incoming calls. If the agent decides to make a reconnection attempt to the dropped customer, then that agent must place themselves in the AUX (auxiliary) or permanent ACW work states so that they become unavailable for other calls from the queue.

In the FIG. 2 case, the ACS agent application relies on first party call control through the Passageway Direct Connect Interface, a small device connected to the COM port of the agent PC, and software that allows for control of incoming calls to agents through the ACS interface. Call information is sent on the Digital Communication Protocol (DCP) line that is connected to the agent's call center telephone. In contrast, the application of FIG. 3 relies on 3rd party call control through the TSAPI compliant Passageway Telephony Services client/server application. This solution makes use of an existing LAN configuration (TCP/IP, IPX, etc) to send all call control requests to the central NT Server that in turn communicates with the PBX.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A video multimedia call center, comprising:
   a) receiving means for receiving at least one external call from a caller, said at least one external call comprising a video signal component generated at a terminal associated with the caller;
   b) automatic call distribution means, associated with said receiving means, for routing said at least one external call to a multimedia agent unit; and c) integration means for integrating said at least one external call with said multimedia agent unit such that said video signal component is displayable at said multimedia agent unit, the external call thereby being configured for at least one of (i) conferencing with another multimedia agent unit and (ii) transfer of the call to another multimedia agent unit.

2. A video multimedia call center according to claim 1, further comprising:
   d) infomercial means for providing a multimedia display to said caller for a time period between initial connection of said at least one external call to said receiving means and said routing of said at least one external call to said multimedia agent unit.

3. A video multimedia call center according to claim 2, further comprising:
   e) queuing means, associated with said automatic call distribution means, for holding said at least one external call in a queue until said multimedia agent unit is available to take said call.

4. A video multimedia call center according to claim 3, further comprising:
   f) switching means, associated with said integration means, for switching an audio external call from said multimedia agent unit to a voice-only agent unit.

5. A video multimedia call center according to claim 3, further comprising:
   f) switching means, associated with said integration means, for switching said at least one external call from said multimedia agent unit to a different multimedia agent unit, wherein said external call contains ITU-T T.120 data and said external call is switched without loss of said ITU-T T.120 data.

6. A video multimedia call center according to claim 1, wherein said automatic call distribution means and said integration means route said at least one external call to an endpoint, wherein said at least one external call complies with ITU-T H.320 standards.

7. A video multimedia call center according to claim 1, wherein said automatic call distribution means and said integration means route said at least one external call to an endpoint, wherein said at least one external call complies with both ITU-T H.320 and ITU-T T.120 standards.

8. A method for agents to interact with customers through and audio/video and data collaboration interface, comprising the steps of:
   a) receiving. at least one external call from a caller, said at least. one external call comprising a video signal component generated at a terminal associated with the caller;
   b) routing said at least one external call to a multimedia agent unit; and
   c) integrating said at least one external call with said multimedia agent unit such that said video signal component is displayable at said multimedia agent unit, the external call thereby being configured for at least one of (i) conferencing with another multimedia agent unit and (ii) transfer of the call to another multimedia agent unit.

9. A method according to claim 8, further comprising:
   d) providing a multimedia display to said caller for a time period between initial connection of said at least one external call and said routing of said at least one external call to said multimedia agent unit.

10. A method according to claim 9, further comprising:
    e) holding said at least one external call in a queue until said multimedia agent unit is available to take said call.

11. A method according to claim 10, further comprising:
    f) switching an audio external call from said multimedia agent unit to a voice-only agent unit.

12. A method according to claim 10, further comprising:
    f) switching said at least one external call from said multimedia agent unit to a different multimedia agent unit, wherein said external call contains ITU-T T.120 data and said external call is switched without loss of said ITU-T T.120 data.

13. A method according to claim 9, wherein said step of routing and said step of integrating route said at least one external call to an endpoint, wherein said at least one external call complies with ITU-T H.320 standards.

14. A method according to claim 9, wherein said step of routing and said step of integrating route said at least one external call to an endpoint, wherein said at least one external call complies with both ITU-T H.320 and ITU-T T.120 standards.

15. A video multimedia call center, comprising:
    a) a private branch exchange for receiving at least one external call from a caller, said at least one external call comprising a video signal component generated at a terminal associated with the caller;
    b) an automatic call distribution center, associated with said private branch exchange, for routing said at least one external call to a multimedia agent unit; and
    c) a video call module for integrating said at least one external call with said multimedia agent unit such that said video signal component is displayable at said multimedia agent unit, the external call thereby being configured for at least one of (i) conferencing with another multimedia agent unit and (ii) transfer of the call to another multimedia agent unit.

16. A video multimedia call center according to claim 15, further comprising:
    d) a multimedia endpoint infomercial for providing a multimedia display to said caller for a time period between initial connection of said at least one external call to said private branch exchange and said routing of said at least one external call to said multimedia agent unit.

17. A video multimedia call center according to claim 16, wherein said video call module includes means for holding said at least one external call in a queue until said multimedia agent unit is available to take said call.

18. A video multimedia call center according to claim 17, wherein said video call module includes means for switching an audio external call from said multimedia agent unit to a voice-only agent unit.

19. A video multimedia call center according to claim 17, wherein said video call module includes means for switching said at least one external call from said multimedia agent unit to a different multimedia agent unit, wherein said external call contains ITU-T T.120 data and said external call is switched without loss of said ITU-T T.120 data.

20. A video multimedia call center according to claim 15, wherein said automatic call distribution center and said video call module route said at least one external call to an endpoint, wherein said at least one external call complies with ITU-T H.320 standards.

21. A video multimedia call center according to claim 15, wherein said automatic call distribution center and said video call module route said at least one external call to an endpoint, wherein said video call complies with both ITU-T H.320 and ITU-T T.120 standards.

* * * * *